J. H. SIMPSON.
Harrow.
No. 211,191. Patented Jan. 7, 1879.
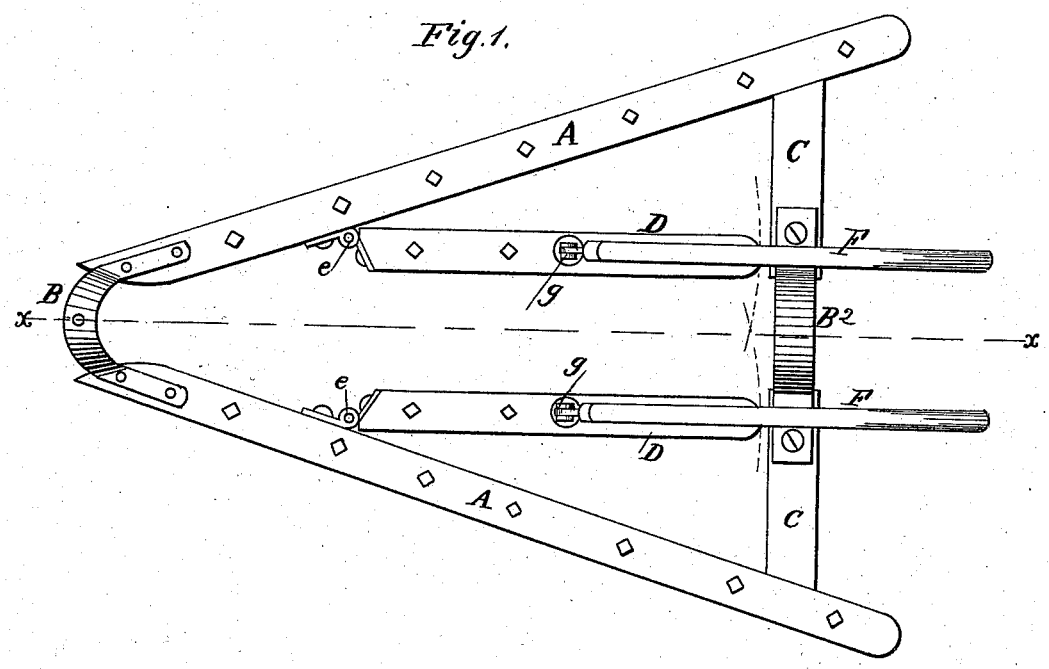
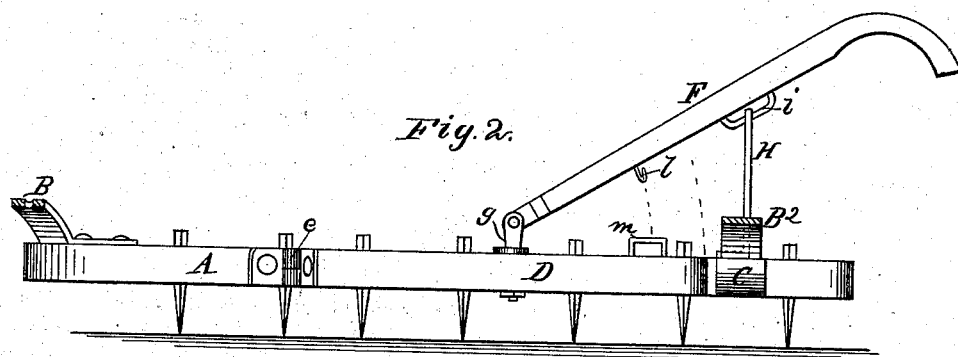
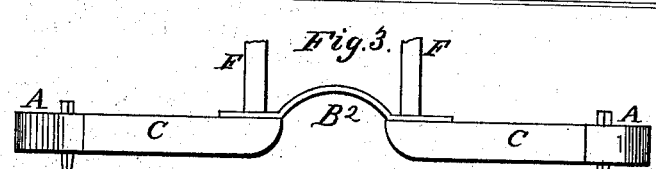
WITNESSES: Henry N. Miller, C. Sedgwick
INVENTOR: J. H. Simpson
BY Munn & Co.
ATTORNEYS.

UNITED STATES PATENT OFFICE.

JOHN H. SIMPSON, OF STONE BLUFFS, INDIANA.

IMPROVEMENT IN HARROWS.

Specification forming part of Letters Patent No. 211,191, dated January 7, 1879; application filed August 16, 1878.

*To all whom it may concern:*

Be it known that I, JOHN HENRY SIMPSON, of Stone Bluffs, in the county of Fountain and State of Indiana, have invented a new and Improved Harrow, of which the following is a specification:

My invention relates to the implement commonly known as "the A-harrow," being formed of two diagonal tooth-carrying bars connected by a transverse bar.

The invention will first be described in connection with the drawing, and then pointed out in the claim.

The accompanying drawing represents a harrow embodying my improvements—

Figure 1 being a top view; Fig. 2, a longitudinal section taken in the line $x\ x$ of Fig. 1, and Fig. 3 a view of the rear end.

Similar letters of reference indicate corresponding parts.

A A represent the two principal tooth-carrying bars, arranged to form two sides of a triangle. Instead of being directly attached to each other at their front ends, and connected by a single bar at their rear ends, as in the ordinary A-harrow, said front ends are connected by a metallic bar, B, which is arched upward high enough to enable it to pass over taller corn than the ordinary harrow, and also to enable the operator to see the corn more distinctly. To the rear ends of the bars A A are attached two transverse wooden bars, C C, which extend inward toward each other, and have their inner ends connected by an arched bar, $B^2$, which is similar to the bar B, before described, and serves a similar purpose.

To the inner side of each main bar A an additional tooth-carrying bar, D, has its front end connected by a hinge, $e$, arranged so that the bar D will oscillate freely both laterally and vertically. Each bar D is connected, about midway of its length, to the lower end of one of the handles F by means of a swivel-joint, $g$. Each handle F is connected, about midway of its length, to the upper end of a standard, H, the lower end of which is attached to one of the bars C. The connection between the handle and the standard may be made by means of a staple, $i$, on the handle and an eye in the upper end of the standard. By this arrangement the operator is enabled to oscillate the bars D at pleasure, either laterally or vertically, and at the same time to have proper control of the entire harrow.

The lower sides of the handles F are provided with hooks $l$, and the upper sides of the bar D are provided with staples $m$; and when the bars D are not in use they may be suspended from the handles by means of these hooks and staples.

Having described my invention, what I claim as new, and desire to secure by Letters Patent, is—

The combination, with an A-harrow having sides A A, with front and rear arches, B $B^2$, of the laterally-pivoted tooth-bars D, handles F, and standards H, as and for the purpose specified.

JOHN HENRY SIMPSON.

Witnesses:
 ROBERT HENDERSON,
 JOHN SLACK.